United States Patent Office 3,663,467
Patented May 16, 1972

3,663,467
POROUS POLYMERS BASED ON TRIMETHYLOL-
PROPANE TRIMETHACRYLATE AND RELATED
MATERIALS
Robert L. Albright, Churchville, Pa., assignor to Rohm
& Haas Company, Philadelphia, Pa.
No Drawing. Continuation-in-part of application Ser. No.
756,392, Aug. 30, 1968. This application July 30, 1969,
Ser. No. 846,271
Int. Cl. B01d 15/08; C08f 29/46, 47/08
U.S. Cl. 260—2.5 B                     14 Claims

ABSTRACT OF THE DISCLOSURE

Porous polymers are prepared by polymerization of a polyfunctional methacrylate such as trimethylolpropane trimethacrylate, either alone or in conjunction with other comonomers in the presence of a variety of phase separating solvents. These porous polymers are useful as adsorbants in both aqueous and non-aqueous media and, when ionic functional groups are incorporated into the resin structure, are also useful as ion exchange resins.

---

This application is a continuation-in-part of my copending application, Ser. No. 756,392, filed Aug. 30, 1968, and now abandoned, entitled "Porous Polymers Based on Trimethylolpropane Trimethacrylate and Related Materials."

This invention relates to porous, macroreticular polymers of trimethylolpropane trimethacrylate (which hereinafter may be referred to as TMPTMA), and related polyfunctional methacrylates, which are useful as adsorbants and/or as ion exchange resins.

Macroreticular resins or polymers are known to the art and are typically aromatic in character, for example, the styrenedivinylbenzene crosslinked macroreticular resins represent a class of well-known and presently commercially available materials. These macroreticular resins contain a significant non-gel porosity in addition to the conventional gel porosity. Methods for preparation of these macroreticular resins are disclosed in copending patent application 749,526 filed July 18, 1958 (Meitzner et al.) and in corresponding British Pats. 932,125, 932,126 and in U.S. Pats. 3,275,548 and 3,357,158.

Briefly, the disclosures of the above application and patents teach that macroreticular resins may be prepared by polymerizing monomers which can cross-link in the presence of a phase separating or phase extending solvent or mixture of solvents that is miscible with the monomers, but which does not dissolve the polymer. The solvent which is usually present in an amount of from about 0.2 to 20 times the weight of the polymerizing monomers must be nonpolymerizable with the monomers, but not dissolve the polymer. The size of the pores in the polymer and the porosity are somewhat dependant upon the kind of solvent employed, e.g., whether an aromatic hydrocarbon such as toluene or ethylbenzene or an aliphatic compound such as heptane or an alcohol such as an iso-amyl alcohol, or a mixture of such compounds is employed. The polymerization is usually carried out in aqueous suspension at temperatures between about 40° to 120° C. and at atmospheric, sub-atmospheric or super-atmospheric pressure, thereby producing polymer beads or granules. These beads or granules possess a network of microscopic channels extending through the mass and while these microscopic channels are very small, they are large in comparison with the pores of conventional crosslinked gels. Typically, these macroreticular polymers have a surface area of at least 5 sq. meters per gram and have pores larger than 15 to 20 A. units. The beads are also usually produced in an over all range of particle size of about 10 to 900 microns.

It has now been discovered that if the porous macroreticular resins or polymers are essentially all aliphatic in character and crosslinked with a polyfunctional methacrylate (containing at least three methacrylate groups) there are produced sorbent products of superior and improved hydrolytic stability, higher wet density, good hydraulic characteristics and superior adsorbent and/or ion exchange properties. Moreover, the aliphatic porous macroreticular polymers of the present invention are effective adsorbents in both aqueous and nonaqueous media, in contrast to prior art materials. The preferred polyfunctional methacrylate is trimethylolpropane trimethacrylate or pentaerythritrol tetramethacrylate. However, the trimethacrylate of glycerol, glucose pentamethacrylate, sorbitol hexamethacrylate and the polyfunctional methacrylates of polyhydric alcohols of 3 to 6 carbon atoms in chain length may also be used. These polyfunctional methacrylates must contain at least three methacrylate groups as heretofore noted. Sutro polyols which are commercially available mixtures of essentially straight chain polyhydric alcohols of 3 to 6 carbon atoms may be used as the source of the polyhydric alcohol.

Surprisingly, it has been found that a high degree of porosity and surface area can be produced by using the polyfunctional methacrylates above noted, whereas the dimethacrylates of the prior art gave virtually no porosity or surface activity. For example, the use of a typical glycol dimethacrylate such as disclosed in Hollis 3,357,158, namly butyleneglycol dimethacrylate when polymerized on a 1 to 1 weight basis with methyl acrylate in the presence of a toluene solvent gave beads with no porosity and with no measurable surface area or pore diameter. However, another copolymer prepared under the same conditions but using trimethylolpropane trimethacrylate and methyl acrylate on a 1 to 1 basis gave polymer beads of high porosity and excellent internal structure: these beads had a porosity of 0.395 cc. pores/cc. beads with an average pore diameter of 359 A. (angstrom units) and a surface area of 59 sq. meters per gram. The crosslinked, porous, macroreticular polymers of the present invention are prepared in the form of rigid, water-insoluble, white or opaque beads with particle sizes in the range of about 10 to 900 microns. In terms of mesh size (U.S. Standard Screen) it is preferred that the particle size be in the range of about 20 to 60 mesh. The porous, macroreticular polymers of the present invention have a surface area of at least about 5 square meters per gram, with the upper limit ranging as high as 2000 square meters per gram. The preferred surface area is in the range of 25 to 500 square meters per gram. The porous polymers of the present invention also have pores with an average pore diameter of at least 15 to 20 angstrom units (A.).

The polymers of the present invention typically contain at least 2% of the polyfunctional methacrylate and can contain up to 100% of said polyfunctional methacrylate. Typical aliphatic, non-aromatic, monoethylenically unsaturated monomers which may be copolymerized with the polyfunctional methacrylate include, for example, ethylene, isobutylene, acrylonitrile, methacrylonitrile, acrylamide, methacrylamide, diacetone acrylamide, vinyl esters, including vinyl chloride, vinyl acetate, vinyl propionate, vinyl butyrate, vinyl laurate, vinyl ketones including vinyl methyl ketone, vinyl ethyl ketone, vinyl isopropyl ketone, vinyl n-butyl ketone, vinyl hexyl ketone, vinyl octyl ketone, methyl isopropenyl ketone, vinyl ethers including vinyl methyl ether, vinyl ethyl ether, vinyl propyl ether, vinyl isobutyl ether, vinylidene compounds including vinylidene chloride, bromide, or bromochloride, esters of acrylic acid and methacrylic acid such as the methyl, ethyl, 2-chloroethyl, propyl, isopropyl, n-butyl, isobutyl, t-butyl, sec-butyl, amyl, hexyl, glycidyl, ethoxyethyl, cyclohexyl, octyl, 2-ethylhexyl, decyl, dodecyl, hexadecyl and octadecyl esters of these acids, hydroxyalkyl methacrylates and acrylates such as hydroxyethyl methacrylate and hydroxypropyl methacrylate, also the corresponding neutral or half-acid half-esters of the unsaturated dicarboxylic acids including itaconic, citraconic, aconitic, fumaric, and maleic acids, substituted acrylamides, such as N-monoalkyl, -N,N-dialkyl-, and N-dialkylaminoalkylacrylamides or methacrylamides where the alkyl groups may have from one to eighteen carbon atoms, such as methyl, ethyl, isopropyl, butyl, hexyl, cyclohexyl, octyl, dodecyl, hexadecyl, and octadecyl, aminoalkyl esters of acrylic or methacrylic acid, such as $\beta$-dimethylaminoethyl, $\beta$-diethylaminoethyl, or 6-dimethylaminohexyl acrylates and methacrylates, alkylthioethyl methacrylates and acrylates such as ethylthioethyl methacrylate, vinylpyridines, such as 2-vinylpyridine, 4-vinylpyridine, 2-methyl-5-vinylpyridine, and so on. In the case of copolymers containing ethylthioethyl methacrylate, the products can be oxidized to, if desired, the corresponding sulfoxide or sulfone to produce additional interesting adsorbents. There may also be copolymerized with the polyfunctional methacrylates hereinbefore mentioned a difunctional methacrylate such as ethylene glycol dimethylacrylate or trimethylolpropane dimethacrylate, but the difunctional methacrylate must not be present in an amount more than about 25% by weight, and preferably not more than 10–15% by weight, based on the weight of the polyfunctional methacrylate.

As heretofore mentioned, it is preferred to use a suspension polymerization technique. The polymerization is carried out at temperatures between about 40° C. and 120° C., and at atmospheric, sub-atmospheric or super-atmospheric pressure, thereby producing polymer beads or granules. A variety of suspending agents may be used to aid in the suspension of the monomer-solvent mixture in an aqueous medium as particles of the desired size. Typical of these materials, a great number of which are known in the art are water soluble polymeric materials such as poly(vinyl alcohol), hydroxyethyl cellulose, methyl cellulose, starch and modified starches, hydrolyzed ethylene-maleic anhydride polymers, hydrolyzed styrene-maleic anhydride copolymers, acrylamide-sodium acrylate copolymers, polyvinylimidazoline polymers and salts thereof, and the like. Other well-known suspending agents are finely divided solids such as magnesium silicate wax and finely divided silica sold under the name Cab-O-Sil, finely divided clays and the like. Also sometimes useful are the conventional surface active materials such as octylphenoxypolyethoxyethanol, sodium lauryl sulfate, sodium stearate and others. Suitable catalysts, usually in the range of 0.01% to 3% by weight with reference to the weight of the monomer or monomer mixture, may be used to provide free radical initiation in the polymerization reaction. Examples include benzoyl peroxide, lauroyl peroxide, t-butyl hydroperoxide, t-butyl perbenzoate cumene peroxide, and azo catalysts such as azodiisobutyronitrile, azodiisobutyramide, etc. Suitable phase-extending or phase separating solvents, include, for example, methyl isobutyl carbinol, methyl isobutyl ketone, n-butyl acetate, xylene, toluene, iso-octane, chlorobenzene, as well as others known to the art.

To assist those skilled in the art to practice the present invention, the following procedures or modes of operation are suggested by way of illustration, parts and percentages being by weight unless otherwise specifically noted.

(1a) Equipment.—All the procedures are carried out with the same equipment except for variations in flask size. Three-necked, round-bottomed flasks of sizes varying from 500 ml. to twelve liters are employed for the preparation of the macroreticular, porous copolymers in quantities from 100 grams to 1500 grams. The standard tapered necks are fitted with a stainless steel, two paddled stirrer; a reflux condenser; a nitrogen inlet; and a long-stemmed, three inch immersion thermometer to which is attached a conductance-sensing head that is connected to a pot lifter via an electronic relay for automatic temperature control. The pot lifter which carried a heating mantle and an air nozzle for both heating and cooling, respectively, and the electronic components of the automatic temperature controlling system are products of Instruments for Research and Industry, Cheltenham, Pa. The stirring motor for maintaining a constant speed of agitation during droplet formation and polymerization is a con-torque with an adjustable speed of 0 to 750 r.p.m. manufactured by Eberbach Corporation, Ann Arbor, Mich.

(1b) Into a 500 ml. flask are placed 208.6 grams of aqueous liquid and 101.0 grams of immiscible organic liquid containing the monomers, so that the weight ratio of aqueous to organic phases is approximately two to one. The composition of the aqueous phase is 200 grams of water, 6 grams of sodium chloride (3.0 wt. percent of water), 0.2 gram of gelatin (0.2 wt. percent of organic phase), and 2.4 grams of 12.5 wt. percent sodium polyacrylate in water (0.3 wt. percent of organic phase is sodium polyacrylate). The composition of the organic layer is 25 grams (0.2904 mole) methyl acrylate inhibited with 200 p.p.m. monomethyl ether of hydroquinone, 25 grams (0.07388 mole) commercial trimethylolpropane trimethylacrylate which contains 89.7 wt. percent trimethylolpropane trimethacrylates and 10.3 wt. percent dimethacrylate ester, 50 grams (0.4894 mole, 50 wt. percent of organic phase) methyl isobutyl carbinol (MIBC), and 0.5 gram (1.0% of monomer weight) lauroyl peroxide. In this procedure the molar ratio of methyl acrylate to the trifunctional crosslinker is 3.93 and the molar ratio of monomer solvent (MIBC) to copolymer is 1.3435. After introduction of the aqueous solution, sufficient concentrated aqueous ammonium hydroxide (several drops) is added to raise the pH to within the range of 8 to 9. After flushing the system with nitrogen, the immiscible mixture is stirred at ambient temperature (about 25° C.) at 145 r.p.m. with as many on-off stirring cycles as necessary to disperse completely all the organic liquid into small droplets (0.2 to 0.5 mm. diameters) in the aqueous layer. When the system in the absence of agitation no longer forms a separate organic layer distinct from the droplet and water layers, the dispersion is heated in an atmosphere of nitrogen at 65° C. for twenty hours with the same agitation used to develop the droplets in order to polymerize the liquid monomer into solid spheres. The product, a copolymer of 44.8% TMPTMA, 5.2% trimethylolpropane dimethacrylate (TMPDMA), and 50% methyl acrylate, is cooled to ambient temperature, washed and dried. The yield of dried product is 45 grams or 90% of theory. The copolymer's physical properties are tabulated below:

Appearance—Opaque white
Apparent density, g. ml.$^{-1}$—0.590
Skeletal density, g. ml.$^{-1}$—1.229
Porosity, ml. pores (ml. beads)$^{-1}$—0.520
Internal surface area, m.$^2$ g.$^{-1}$—77
Average pore diameter, A.—456

(1c) The procedure of (1b), above, is repeated, except that there is used a variety of phase-extending solvents in place of the MIBC; the results follow in Table I:

TABLE I

| Extending solvent | Percent extender | Appearance | App. density, g./ml. | Skel. density, g./ml. | Porosity, ml. pore/ ml. bead | Surface area, m.²/g. | Avg. pore dia., A. |
|---|---|---|---|---|---|---|---|
| Xylene | 50 | Opaque white | .682 | 1.236 | .448 | 70 | 378 |
| n-Butylacetate | 50 | ....do | .678 | 1.232 | .450 | 55 | 481 |
| Iso-octane | 50 | Opaque "popcorn" | .334 | 1.263 | .736 | 11 | 8,387 |
| MIBK [1] | 50 | Opaque white | .741 | 1.245 | .405 | 54 | 408 |

[1] Methylisobutyl ketone.

(1d) The procedure of (1b), above, is repeated, except that there is used toluene as the phase-extending solvent and a monomer mixture of 50% methyl acrylate and 50% TMPTMA. The resulting beads are opaque white in appearance, have a surface area of about 33 sq. meters per gram, an average pore diameter of 365 A., an apparent density of about 0.9 g. per ml., and a porosity of about 0.27 ml. pore per ml. bead.

(2a) Following the teachings of procedure (1), 6000 grams of water, 180 grams (3.0% of water) of sodium chloride, 6 grams (0.2% of organic phase) of gelatin, and 72 grams of a 12.5 wt. percent aqueous solution of sodium polyacrylate (0.3 wt. percent of organic phase is sodium polyacrylate) are mixed in a twelve liter flask until a homogeneous solution results. After the pH of the aqueous solution is adjusted to 8 to 9 with concentrated aqueous ammonia a mixture of 900 grams (2.66 moles) of commercial trimethylolpropane trimethacrylate with 9 grams (1.0 wt. percent of monomer) of lauroyl peroxide, and 2100 grams (22.79 moles, 70 wt. percent of the organic phase) of toluene is introduced into the reactor. (The commercial trimethylolpropane trimethacrylate analyzed by gas-liquid chromatography to be 92% triester and 8% diester, i.e., trimethylolpropane dimethacrylate.) The dispersion of organic liquid in an aqueous phase is prepared at ambient temperature at 80 r.p.m. with on-off agitation cycles until only droplet and aqueous phases remains in the absence of stirring. Formation of the dispersion requires approximately fifteen minutes. The droplets are polymerized under nitrogen at 65° C. for 20 hours into solid, opaque spheres, washed, and dried. The yield of dried copolymer is 896 grams or 99.5% of theory. The physical characteristics of the porous beads are:

Appearance—Opaque white
Apparent density, g. ml.$^{-1}$—0.564
Skeletal density, g. ml.$^{-1}$—1.245
Porosity, ml. pores (ml. beads)$^{-1}$—0.547
Surface area, m.² g.$^{-1}$—445
Average pore diameter, A.—87

(2b) The procedure of (2a) above is repeated, except that a purer sample of trimethylolpropane trimethacrylate (100%) is used. The TMPTMA homopolymer beads have an average pore diameter of greater than about 80 A. and a surface area of greater than about 400 sq. meters per gram.

(3a) Following the teachings of (1b) above, porous copolymer beads are prepared in a one-liter flask from a mixture of 50 grams (0.499 mole) of methyl methacrylate, 50 grams (0.148 mole) of commercial trimethylolpropane trimethacrylate 1.0 gram of lauroyl peroxide, and 100 grams (0.979 mole, 50 wt. percent of the organic phase) of methyl-isobutylcarbinol. The commercial trimethylolpropane trimethacrylate contains 93% triester and 7% diester. The aqueous phase is composed of 400 grams of water, 12 grams of sodium chloride, 0.8 gram of gelatin, and 9.6 grams of 12.5 wt. percent aqueous sodium polyacrylate solution. The pH of the aqueous phase is adjusted with concentrated ammonium hydroxide to 8 to 9; the stirring speed for formation of the monomer droplets is 150 r.p.m. The yield of porous, opaque, white beads is 99 grams of 98.0% of theory. The measured physical properties are listed as follows:

Appearance—Opaque white
Apparent density, g. ml.$^{-1}$—0.605
Skeletal density, g. ml.$^{-1}$—1.243
Porosity, ml. pores (ml. beads)$^{-1}$—0.513
Surface area, m.² g.$^{-1}$—160
Average pore diameter, A.—212

(3b) Following the procedure of (3a) above but using comonomers other than methyl acrylate, there are produced copolymeric beads of the following compositions and properties:

TABLE II

| | Composition | | | | Properties of final product | | |
|---|---|---|---|---|---|---|---|
| Percent comonomer | Percent TMPTMA | Percent TMPDMA | Added solvent | Percent solvent | Porosity, cc. pores/ cc. beads | Surface area, m.²/gm. | Average pore dia., A. |
| Acrylonitrile 50 | 46.5 | 3.5 | MIBC | 50 | .636 | 79 | 716 |
| Butyl methacrylate 50 | 46.5 | 3.5 | MIBC | 50 | .312 | 118 | 132 |
| Methyl methacrylate 50 | 46.5 | 3.5 | MIBC | 50 | .513 | 160 | 212 |
| Ethyl acrylate 50 | 46.5 | 3.5 | MIBC | 50 | .553 | 89 | 455 |

(4a) Porous copolymer beads are prepared following the general procedure as described in Example 1 from a mixture of 25 grams (0.347 mole) of acrylic acid, 25 grams (0.0739 mole) commercial trimethylolpropane trimethacrylate, which is 89.7% triester and 10.3% diester, 0.5 gram lauroyl peroxide, and 50 grams (0.430 mole, 50 wt. percent of the organic phase) of n-butyl acetate. The aqueous phase for formation of the dispersion is composed of 150 grams of water, 61.3 grams of sodium chloride (a saturated salt solution), and 2.1 grams of a 30 wt. percent aqueous solution of sodium polyacrylate. The pH of the aqueous phase is adjusted to 8 to 9 prior to development of the dispersion. Monomer droplets of the proper size are formed at a stirring speed of 215 r.p.m. in a 500 ml. flask. The yield of washed, dried copolymer is 47 grams of 94% of theory. The chemical and physical properties are given below:

Appearance—Shiny white opaque beads
Apparent density, g. ml.$^{-1}$—0.729
Skeletal density, g. ml.$^{-1}$—1.326
Porosity, ml. pores (ml. beads)$^{-1}$—0.450
Surface area, m.² g.$^{-1}$—32
Average pore diameter, A.—772
Carboxylic acid capacity, meq. g.$^{-1}$—5.87

(5a) Post reaction of macroreticular TMPTMA copolymers.—One-half gram equivalent, 86.1 grams, of a porous copolymer composed of 50 wt. percent methyl acrylate, 46 wt. percent trimethylolpropane trimethacrylate, and 4 wt. percent trimethylolpropane dimethacrylate is treated in 2-propanol under nitrogen at reflux temperature for 88 hours with a mixture of 149 grams (1.5 moles) (32.27 wt. percent hydrazine) of aqueous hydrazine solution and of 84.1 grams (1.5 moles) of hydrazine monohydrate. During the reaction period the reflux temperature rises from 85° C. to 120° C. An infrared spectrum of an aliquot of the beads after removal of reagents by treatment with methanol and drying indicated that some reaction had occurred after 16.5 hours. After 16.5 hours the ratio of absorbance of the amide band (1640 cm.$^{-1}$) of the hydrazide to the ester band (1720 cm.$^{-1}$) is 0.249. At the end of 8 8hours the ratio of the absorbance of the amide band (1635 cm.$^{-1}$) of the hydrazide to the ester band (1705 cm.$^{-1}$) is 1.178. The elemental analysis for nitrogen indicates that the hydrazonolysis of the methyl ester groups in the terpolymer had occurred to the extent of 85.7% of theory, if it is assumed that only the methyl ester groups are reactive and that the equivalent weight of the terpolymer is, as calculated, 172.18. The chemical and physical properties of the porous polymer are tabulated below:

Appearance—Opaque white
Apparent density, g. ml.$^{-1}$—0.540
Skeletal density, g. ml.$^{-1}$—1.357
Porosity, ml. pores (ml. beads)$^{-1}$—0.602
Surface area, m.$^2$ g.$^{-1}$—53
Average pore diameter, A.—842
Elemental analysis—
  Percent C—46.29
  Percent H—7.71
  Percent O—26.03
  Percent N—13.93.

The physical properties of the starting copolymer are as follows:

Appearance—Opaque white
Apparent density, g. ml.$^{-1}$—0.526
Skeletal density, g. ml.$^{-1}$—1.268
Porosity, ml. pores (ml. beads)$^{-1}$—0.585
Surface area, m.$^2$ g.$^{-1}$—79
Average pore diameter, A.—563.

(5b) Following the teaching of (5a) above, ion exchange properties are developed in the TMPTMA copolymers and the results are tabulated below in Table III:

reached a leakage value of 50 p.p.m. phenol. A total of 77.1 milligrams or 99.5 percent of the influent solute is adsorbed on the resin within the column at this leakage level.

(6b) Procedure (6a) above is repeated with 500 p.p.m. phenol solution in deionized water. Eighteen bed volumes of the phenol in water solution are passed before the concentration of the effluent solution has reached a leakage value of 50 p.p.m.

(6c) Adsorption of fatty acids from aqueous and non-aqueous solutions; equilibrium procedures at 25° C.—One gram of the adsorbent copolymer used in (6a) above is contacted with a 20 ml. solution of fatty acid in water or in toluene (after the adsorbent is swollen with the appropriate solvent). The results shown in Table IV indicate that the adsorption from the aqueous solution increases with increasing number of carbon atoms (therefore with increasing hydrophobicity of the sorbate).

On the other hand, the adsorption from toluene solution decreases with increasing hydrophobicity of the molecule, but becomes considerable for the more polar molecules. Thus, separations due to selective adsorption of the aliphatic sorbents or porous copolymers of this invention can be achieved in aqueous or in non-aqueous solutions.

TABLE IV.—EQUILIBRIUM EXPERIMENTS—25° C.

Acetic acid

| Aqueous solution | | Toluene solution | |
|---|---|---|---|
| Amount adsorbed, m. moles ——10$^2$ g. | Equil. conc., moles/l. | Amount adsorbed, m. moles ——10$^2$ g. | Equil. conc., moles/l. |
| 52.8 | .151 | 87.4 | .144 |
| 97.7 | .304 | 150.1 | .296 |
| 144.8 | .457 | 207.7 | .448 |

Butyric acid

| 94.6 | .086 | 39.9 | .103 |
| 158.6 | .183 | 64.2 | .210 |
| 217.7 | .278 | 92.0 | .316 |

(6d) Procedure (6a) above is repeated with a 500 p.p.m. phenol solution in hexane but using a 5 ml. column of a macroreticular, porous copolymer of 50% methyl methacrylate, 46.5% trimethylolpropane trimethacrylate and 3.5% trimethylolpropane dimethacrylate (made according to the teachings of procedure (3a) above). After twenty-eight bed volumes of the influent solution are

TABLE III

| Copolymer composition | | | | | Elemental analysis and capacity | | | | | | |
|---|---|---|---|---|---|---|---|---|---|---|---|
| Percent | | | | | Percent | | | | Capacity, meq. g.$^{-1}$ | | |
| TMPTMA | TMPDMA[1] | MA | Phase extender | Conc. phase extender, percent | Post treatment | C | H | O | N | Anion exch. | Cation exch. | Percent solids |
| 46 | 4 | 50 | MIBC | 50 | DMAPA[2] | 58.10 | 8.53 | 27.30 | 3.99 | 1.96 1.46 | 1.71 2.36 | 34.7 35.9 |
| 46 | 4 | 50 | MIBC | 50 | DMAPA | 58.00 | 8.43 | 25.67 | 5.64 | 2.38 | 3.64 | 33.9 |
| 46 | 4 | 50 | Toluene | 50 | Hydrolysis | 54.40 | 7.13 | 33.61 | | | 5.74 | 40.4 |
| 46 | 4 | 50 | do | 40 | Acidolysis[3] | 54.55 | 6.75 | 35.40 | | | 4.80 | 48.3 |

[1] MA=Methyl acrylate.
[2] DMAPA=3-dimethylamino propylamine.
[3] Acidolysis is carried out with acetic acid with sulfuric acid as catalyst.

The porous copolymers of the present invention are particularly useful as adsorbents in both aqueous and non-aqueous systems. For example, the absorption of phenols from various media with a representative copolymer of the present invention is given below:

(6a) Thirty-seven bed volumes of a 500 p.p.m. phenol solution in hexane are passed at 25° C. through a five ml. column of a macroreticular, porous copolymer of 92% trimethylolpropane trimethacrylate and 8% trimethylolpropane dimethacrylate (prepared according to the teachings of (2a) above) operated at a 0.5 gal./ft.$^3$/min. flow rate. Thirty-one bed volumes of the influent solution are passed before the concentration of the effluent solution has passed no phenol is still detected in the effluent solution and it is not until thirty-one bed volumes are passed that phenol is present to the extent of 50 p.p.m. in the effluent solution.

The porous adsorbents of this invention are also useful in adsorbing color bodies from aqueous sugar solutions as well as decolorizing other aqueous and non-aqueous solutions and systems.

(7) Synthesis of porous copolymer of 50 weight percent diacetone acrylamide (N-[2-(2-methyl-4-oxopentyl)]-acrylamide) and 50 weight percent trimethylolpropane trimethacrylate.—A dispersion of monomer droplets in water is prepared by stirring a two phase system of monomer and water at a suitable r.p.m. at room temperature to get the proper bead size. The aqueous phase, which is present in the final dispersion at a weight ratio to organic phase of three to one, is composed of 423 gm. (23.47 moles) of water, 171 gm. (2.93 moles) of sodium chloride, and 3.0 gm. (~1.5×10⁻⁶ mole) poly(vinylimidazolinium bisulfate) salt (MW of 2×10⁶). The poly(vinylimidazolinium bisulfate)salt is dissolved by slow addition of the powdered solid to a portion of the water with rapid mixing in a three-necked round-bottomed flask. The remainder of the water and the sodium chloride are introduced with stirring to give a homogeneous aqueous soltuion. The organic phase is prepared separately by mixing 35.0 gm. (0.2068 mole) diacetone acrylamide, 35.0 gm. (0.1034 mole) of commercial trimethylolpropane trimethacrylate (94 wt. percent trimethylolpropane trimethacrylate and 6 wt. percent trimethylolpropane dimethacrylate), 130.0 gm. (1.27 moles) of methylisobutylcarbinol, and 0.7 gm. (1.756×10⁻³ mole) lauroyl peroxide until homogeneous. The organic solution is poured into the reactor, and the organic droplets are formed in the aqueous medium by stirring (183 r.p.m.). When all the organic phase has been transformed into droplets with no remaining bulk phase, the system is heated to 65° C. and held at this temperature for 20 hours. The resulting opaque copolymer is cooled to room temperature; freed of mother liquor; washed three times with water (one bed-volume each wash), five times with methanol, three times with ethylene dichloride, four times with methanol; and dried overnight in a steam oven at 75° C. A 20 to 30 mesh cut of U.S. Sieve Series is measured for physical properties. The yield of dried copolymer is 95.7% of theory. The weight percent nitrogen in the final copolymer measures 3.94%. The physical properties are given below:

Appearance—Opaque white or off-white
Apparent density, g. cm.⁻¹—0.692
Skeletal density, g. cm.⁻¹—1.181
Porosity, vol. percent—41.4
Surface area, m.² g.⁻¹—68
Average pore diameter, A.—351

This copolymer is effective in adsorbing phenol from nonaqueous solutions, and in particular, in removing phenol from hexane and also phenol from benzene. A very practical application of this is the removal of phenol from crude oils.

(8) Synthesis of porous copolymer of 50 weight percent 2-(ethylthio)-ethyl methacrylate and 50 weight percent trimethylolpropane trimethacrylate.—A dispersion of monomer droplets in water is prepared as in procedure (7) above. The aqueous phase composition is 423 gm. (23.47 moles) water, 171 gm. (2.93 moles) sodium chloride, and 3.0 gm. (~1.5×10⁻⁶ mole) poly(vinylimidazolinium bisulfate) salt (MW ~2×10⁶). The organic phase is composed of 70.0 gm. (0.4017 mole) 2-(ethylthio)-ethyl methacrylate, 70.0 gm. (0.2069 mole) commercial trimethylolpropane trimethacrylate (94 wt. percent trimethylolpropane trimethacrylate and 6 wt. percent trimethylpentane), and 1.4 gm. (8.53×10⁻³ mole) azobisisobutyronitrile. The aqueous to organic phase weight ratio is approximately three to one. The monomer droplets are formed at room temperature by agitation at the stirring speed which provides the proper particle size (210 r.p.m. in this example). The dispersion is heated to 65° C. and kept at 65° C. for twenty hours. The opaque white beads are cooled to ambient temperature; washed three times with water, five times with methanol, three times with ethylene dichloride, and four times with methanol; and dried in a steam oven overnight at 75° C. The yield of dried product is 97.9% of theory; the sulfur content is 9.54 wt. percent by elemental analysis. A 20 to 30 mesh cut of U.S. Sieve Series is measured for physical properties which are given below:

Appearance—Opaque white or off-white
Apparent density, g. cm.⁻¹—0.731
Skeletal density, g. cm.⁻¹—1.220
Porosity, vol. percent—40.1
Surface area, m.² g.⁻¹—81
Average pore diameter, A.—271

This copolymer may be used in a wide variety of applications, for example, in the removal of phenol from nonaqueous solutions.

(9) Synthesis of porous copolymer of 2-(ethylsulfinyl)-ethyl methacrylate with trimethylolpropane trimethacrylate.—Aqueous hydrogen peroxide (11.3 g., 0.1 mole of 30 wt. percent H₂O₂), 37.8 g. (0.10 eq. wt. based on elemental sulfur analysis) of a copolymer of 50 wt. percent ethylthioethyl methacrylate cross-linked with 47 wt. percent trimethylolpropane trimethacrylate and 3 wt. percent trimethylolpropane dimethacrylate, and 200 ml. of glacial acetic acid are introduced into a reactor with agitation. A very mild exotherm of about 3° C. occurs upon mixing the three components at ambient temperature. After standing over night for approximately sixteen hours, the mixture contains unreacted hydrogen peroxide. The mixture is, therefore, heated at 50° C. for twenty hours after which a test for hydrogen peroxide is negative. The interstitial liquid is siphoned from the copolymer and the copolymer is washed stepwise three times with water and four times with methanol. Each treatment with water and methanol is carried out for a duration of about forty minutes after which the bulk liquid is siphoned off. The yield of dried product is 93.6% of theory; the elemental analysis indicates 7.60 wt. percent sulfur, 27.97 wt. percent oxygen, 54.29 wt. percent carbon, and 7.51% hydrogen. The physical properties are given below:

Appearance—Opaque white or off-white
Apparent density, g. cm.⁻¹—0.706
Skeletal density, g. cm.⁻¹—1.028
Porosity, vol. percent—44.9
Surface area, m.² g.⁻¹—69.5
Average pore diameter, A.—366

This product, i.e. the sulfoxide or mono-oxidation product, shows excellent adsorbent properties, for example in removing benzene from hexane, in removing by adsorbtion oleic acid from toluene and also acetic acid from toluene.

(10) Synthesis of porous copolymer of 2-(ethylsulfonyl)ethyl methacrylate with trimethylolpropane trimethacrylate.—To a three-liter reactor are charged with stirring 344 g. (1.0 g. eq. based on elemental sulfur analysis of 9.32%; eq. wt., 344.03) of copolymer whose composition is 50 wt. percent 2-(ethylthio)ethyl methacrylate, 47 wt. percent trimethylolpropane trimethacrylate, and 3 wt. percent trimethylolpropane dimethacrylate and 1.5 liters (1573.5 g., 26.20 moles) glacial acetic acid. Over a one-half hour period is added 567 g. (5.0 moles H₂O₂) of thirty percent aqueous hydrogen peroxide with external cooling in order to maintain a temperature of 35° C. The slurry is stirred for 48 hours, the interstitial liquid is siphoned from the copolymer, and the copolymer is washed stepwise four times with water and four times with methanol to remove acetic acid and excess hydrogen peroxide. Each wash treatment is carried out for a duration of about forty minutes after which the bulk liquid is siphoned off. The yield of dried product is 375 g. or 98.5% of theory; the elemental analysis indicates 8.30 wt. percent sulfur, 29.47 wt. percent oxygen, 54.06 wt. percent carbon, and 7.45 wt. percent hydrogen. The calculated formula weight is 380.52 g. with a calculated elemental analysis of 54.46% C, 7.27% H, 29.84% O, and 8.43% S. The empirical formula is calculated to be $C_{17.25}H_{27.44}O_{7.10}S$. The measured physical properties are listed below:

Appearance—Opaque white or off-white
Apparent density, g. ml.⁻¹—0.722
Skeletal density, g. ml.⁻¹—1.305
Porosity, vol. percent—44.7
Surface area, m.² g.⁻¹—66
Average pore diameter, A.—375

This product (oxidized to the sulfone form) shows excellent adsorbent properties, for example in adsorbing benzene from hexane, and in removing by adsorption oleic acid or acetic acid from toluene.

(11) Synthesis of porous copolymer of 2-hydroxypropyl methacrylate with trimethylolpropane trimethacrylate.—A dispersion of monomer droplets in water is prepared as described in procedure (7) above. The aqueous phase composition in 423 gm. (23.47 moles) water, 171 gm. (2.93 moles) sodium chloride, and 3.0 gm.

($\sim 1.5 \times 10^{-6}$ mole)

poly(vinylimidazolinium bisulfate)salt (MW $\sim 2 \times 10^6$). The organic phase is composed of 50 gm. (0.3468) 2-hydroxypropyl methacrylate, 50 gm. (0.1478 mole) commercial trimethylolpropane trimethacrylate (93 wt. percent trimethylolpropane trimethacrylate and 7 wt. percent trimethylolpropane dimethacrylate), 100 gm. (1.0854 moles) toluene, and 1.0 gm. ($2.51 \times 10^{-3}$ mole) lauroyl peroxide.

The aqueous to organic phase weight ratio is approximately three to one. The monomer droplets are formed at room temperature by agitation at the stirring speed which provides the proper particle size (153 r.p.m. in this example). The dispersion is heated to 65° C. and kept at 65° C. for twenty hours. The opaque white beads are cooled to ambient temperature; washed three times with water, five times with methanol, three times with ethylene dichloride, and four times with methanol; and dried in a steam oven overnight at 75° C. The yield of dried product is 100 gm. or 100% of theory. A 20 to 30 mesh cut of U.S. Sieve Series is measured for physical properties, which are given below:

Appearance—Opaque white or off-white
Apparent density, g. cm.$^{-1}$—0.612
Skeletal density, g. cm.$^{-1}$—1.295
Porosity, vol. percent—52.7
Surface area, m.$^2$ g.$^{-1}$—97
Average pore diameter, A.—354

(12) Synthesis of porous copolymer of 2-hydroxyethyl methacrylate with trimethylolpropane trimethacrylate.—A dispersion of monomer droplets in water is prepared as described in procedure (7) above. The aqueous phase composition is 423 gm. (23.47 moles) water, 171 gm. (2.93 moles) sodium chloride, and 3.0 gm. ($\sim 1.5 \times 10^{-6}$ mole) poly(vinyl-imidazolinium bisulfate)salt (MW $\sim 2 \times 10^6$). The organic phase is composed of 50 gm. (0.3842 mole) 2-hydroxyethyl methacrylate, 50 gm. (0.1478 mole) commercial trimethylolpropane trimethacrylate (93 wt. percent trimethylolpropane trimethacrylate and 7 wt. percent trimethylolpropane dimethacrylate), 100 gm. (0.9788 mole) methylisobutylcarbinol, and 1.0 gm. ($2.5 \times 10^{-3}$ mole) lauroyl peroxide.

The aqueous to organic phase weight ratio is approximately three to one. The copolymer is obtained from the monomer droplets by polymerization at a stirring speed of 200 p.r.m. at 65° C. for 20 hours. The opaque white beads of copolymer are isolated and cleaned up as described in procedure (7) above. The physical properties of the 20–30 mesh cut (U.S. Sieve Series) are given below. The yield of dried product is 99 gm. or 99% of theory.

Appearance—Opaque white or off-white
Apparent density, g. cm.$^{-1}$—0.995
Skeletal density, g. cm.$^{-1}$—1.328
Porosity, vol percent—25.1
Surface area, m.$^2$ g.$^{-1}$—49
Average pore diameter, A.—204

(13) Synthesis of porous copolymer of N,N-dimethylacrylamide with pentaerythritol tetramethacrylate.—A dispersion of monomer droplets in water is prepared and polymerized as described in procedure (7) above. The organic phase is composed of 50 gm. (0.5044 mole) N, N-dimethylacrylamide, 37.5 gm. (0.0918 mole) pentaerythritol tetramethylacrylate, 12.5 gm. (0.0367 mole) pentaerythritol trimethacrylate, 100 gm. (0.9420 mole) xylene, and 1.0 gm. ($2.51 \times 10^{-3}$ mole) lauroyl peroxide. The monomers of pentaerythritol tetramethacrylate and the trimethacrylate are supplied as a 51 wt. percent solution in xylene, 75 wt. percent of which is the tetra-ester and 25 wt. percent of which is the tri-ester. The droplet size distribution is obtained at 198 r.p.m.; the yield of opaque while copolymer is 88% of theory. The physical properties of the product cleaned up as in procedure (7) above, are given below. The nitrogen content of the copolymer is 6.15 wt. percent.

Appearance—Opaque white or off-white
Apparent density, g. cm.$^{-1}$—0.529
Skeletal density, g. cm.$^{-1}$—1.230
Porosity, vol. percent—57.0
Surface area, m.$^2$ g.$^{-1}$—296
Average pore diameter, A.—146

(14) Synthesis of porous copolymer of 2-(N,N-dimethylamino)ethyl methacrylate crosslinked with pentaerythritol tetramethacrylate.—Porous copolymer is spherical bead form is obtained as described in procedure (7) above. The monomer droplets are formed at 176 r.p.m.; the polymerization and product clean-up are carried out exactly as described in procedure (7). The organic phase is prepared from 50 gm. (0.3180 mole) 2-(N,N-dimethylamino)ethyl methacrylate, 37.5 gm. (0.0918 mole) pentaerythritol tetramethacrylate, 12.5 gm. (0.0367 mole) pentaerythritol trimethacrylate, 100 gm. (0.9420 mole) xylene, and 1.0 gm. ($2.51 \times 10^{-3}$ mole) lauroyl peroxide. The monomer of pentaerythritol estern is handled as a 51 wt. percent solution of ester in xylene; the ester composition is 75 wt. percent pentaerythritol tetramethacrylate. The yield of product with 3.32 wt. percent nitrogen is 70 gm. or 70% of theory. The physical properties of the product are given below.

Appearance—Opaque white or off-white
Apparent density, g. cm.$^{-1}$—0.955
Skeletal density, g. cm.$^{-1}$—1.207
Porostiy, vol. percent—20.9
Surface area, m.$^2$ g.$^{-1}$—88
Average pore diameter, A.—99

The porous copolymer products of procedures (11), (12), (13) and (14) are all effective adsorbents and may be used, for example, to remove by adsorption phenol from hexane.

What I claim is:

1. A porous, adsorbent macroreticular essentially all aliphatic polymer having pores with an average diameter of at least 15 to 20 A. and a surface area of at least 5 square meters per gram, said polymer being rigid and crosslinked and composed of 2 to 100% by weight of a polyfunctional methacrylate containing at least three methacrylate groups.

2. A porous, macroreticular polymer according to claim 1 wherein the polyfunctional methacrylate is trimethylolpropane trimethacrylate or pentaerythritol tetramethacrylate.

3. A porous, macroreticular polymer according to claim 1 wherein the polymer contains an aliphtaic, non-aromatic, co-monomer which may be monoethylenically unsaturated or which may be a difunctional monomer, copolymerized with the polyfunctional methacrylate.

4. A porous, macroreticular polymer according to claim 1, in the form of finely divided beads.

5. A porous, macroreticular polymer according to claim 3 wherein the co-monomer is diacetone acrylamide or N, N-dimethylacrylamide.

6. A porous, macroreticular polymer according to claim 3 wherein the co-monomer is 2-hydroxyethyl methacrylate or 2-hydroxypropyl methacrylate.

7. A porous, macroreticular polymer according to claim 3 wherein the co-monomer is 2-(N,N-dimethylamino) ethyl methacrylate.

8. A porous, macroreticular polymer according to claim 3 wherein the polyfunctional methacrylate is trimethylolpropane trimethacrylate copolymerized with 2-(ethylthio)-ethyl methacrylate, 2-(ethylsulfinyl)-ethyl methacrylate or 2-(ethylsulfonyl)-ethyl methacrylate.

9. A porous, macroreticular polymer according to claim 1, said polymer being composed of about 50% methyl acrylate, about 5.2% trimethylolpropane dimethacrylate and about 44.8% trimethylolpropane trimethacrylate, all percentages being by weight.

10. A porous, macroreticular polymer according to claim 1, said polymer being composed of about 92% trimethylolpropane trimethacrylate and about 8% trimethylolpropane dimethacrylate, all percentages being by weight.

11. A porous, macroreticular polymer according to claim 1, said polymer being composed of about 50% methyl methacrylate, about 46.5% trimethylolpropane trimethacrylate and about 3.5% trimethylolpropane dimethacrylate, all percentages being by weight.

12. A process of preparing a porous, adsorbent, macroreticular essentially all aliphatic polymer having pores with an average diameter of at least 15 to 20 A. and a surface area of at least 5 square meters per gram, said polymer being rigid and crosslinked and composed of 2 to 100% by weight of a polyfunctional methacrylate containing at least 3 methacrylate groups, which comprises suspension polymerizing said polyfunctional methacrylate at a temperature between about 40° C. to 120° C., and in the presence of a phase-extending solvent which is miscible with the polyfunctional methacrylate monomer, but which does not dissolve the polymer thereof.

13. An adsorption process in which a porous polymer according to claim 1 is contacted with an aqueous or non-aqueous liquid containing a selectively adsorbable component, whereby said component is adsorbed by the porous polymer.

14. An adsorption process according to claim 13 wherein the adsorbable component is a color-body.

References Cited

UNITED STATES PATENTS

| | | | |
|---|---|---|---|
| 3,220,960 | 11/1965 | Wichterle | 260—2.5 M |
| 3,418,262 | 12/1968 | Werotte et al. | 260—2.5 B |
| 3,275,548 | 9/1966 | Walters | 210—24 |
| 3,357,158 | 12/1967 | Hollis | 260—2.5 R |
| 3,531,463 | 9/1970 | Gustafson | 260—211.5 |

OTHER REFERENCES

Rohm and Hass Company bulletin CM–32 June 1969.
Rohm and Hass Company bulletin SP–237 March 1967.

SAMUEL H. BLECH, Primary Examiner

W. J. BRIGGS, Sr., Assistant Examiner

U.S. Cl. X.R.

210—24, 39, 502; 260—2.1 R, 2.5 M, 79.5 C, 80.81, 86.1 E, 89.5 R, 89.5 S